Oct. 21, 1969 — C. A. LEWIS, JR — 3,474,311
WEB CONTROL SYSTEMS WITH INTEGRATOR
Filed Dec. 7, 1966 — 8 Sheets-Sheet 1

INVENTOR.
CLARENCE A. LEWIS, Jr.
BY *James and Franklin*
ATTORNEYS

INVENTOR.
CLARENCE A. LEWIS, Jr.
BY
James and Franklin
ATTORNEYS

Oct. 21, 1969

C. A. LEWIS, JR 3,474,311

WEB CONTROL SYSTEMS WITH INTEGRATOR

Filed Dec. 7, 1966

FIG. 5

INVENTOR
CLARENCE A. LEWIS, Jr.

BY
James and Franklin
ATTORNEYS

INVENTOR.
CLARENCE A. LEWIS, Jr.
BY
James and Franklin
ATTORNEYS

United States Patent Office 3,474,311
Patented Oct. 21, 1969

3,474,311
WEB CONTROL SYSTEMS WITH INTEGRATOR
Clarence A. Lewis, Jr., Kinnelon, N.J., assignor to Bobst Champlain, Inc., Roseland, N.J., a corporation of New York
Filed Dec. 7, 1966, Ser. No. 599,929
Int. Cl. H02p *5/04, 15/00*
U.S. Cl. 318—6                13 Claims

ABSTRACT OF THE DISCLOSURE

The improvement is a web control system for maintaining constant web tension, or for varying web tension or a shaft position in order to maintain registration of printing stations or a cut-to-print station. In the improved system there is not only the usual proportional error signal, but also an integrator for the proportional error signal, and both the proportional error signal and its integral are summed, and the sum is used as a correction signal for varying the energization of a brake or clutch or motor.

SUMMARY OF THE INVENTION

The web control system comprises means to detect a web error and to provide an electrical signal which is approximately proportional to the error. There is also a means to integrate the proportional error signal, and a summing amplifier to which both the proportional error signal and its integral are supplied in order to provide a correction signal which is their sum. There is also an error correction means responsive to the correction signal for correction in that direction which tends to reduce the error.

If the web is being pulled from a supply roll the correction means may be an electric or magnetic brake, and this may be applied to the shaft of the supply roll, or to the shaft of a drag roll. The error detection means for uniform web tension may be a strain gauge mounted on a frame carrying a roll around which the web passes.

To maintain registration in the case of a preprinted web, by varying the web tension, the error detection means may include a known web scanner for scanning the web near a station having a shaft and operating on the web, and a known phase micrometer rotating with the said shaft, and a known computer having electronic circuitry which compares signals from the scanner and from the phase micrometer to derive the proportional error signal. This system is particularly good when the web is a plastic film which is yieldable.

Instead of a magnetic brake the correction means may be a motor which either assists or brakes the movement of the web, as needed.

The system also may be applied to a web line having two or more stations with rotating rolls (e.g. feed rolls or printing rolls or cut-off mechanism), in which there is a common main drive shaft geared to and driving the different station shafts in unison, and in which one of the station shafts has a running register of the differential gear type. In such case the correction motor is connected to the running register to feed an extra component of motion to the station shaft. Here again the error detection means may be either a strain gauge for uniform web tension, or a web scanner for variable web tension.

The foregoing and additional features are described in the following detailed specification, which is accompanied by drawings in which.

Figure 1:
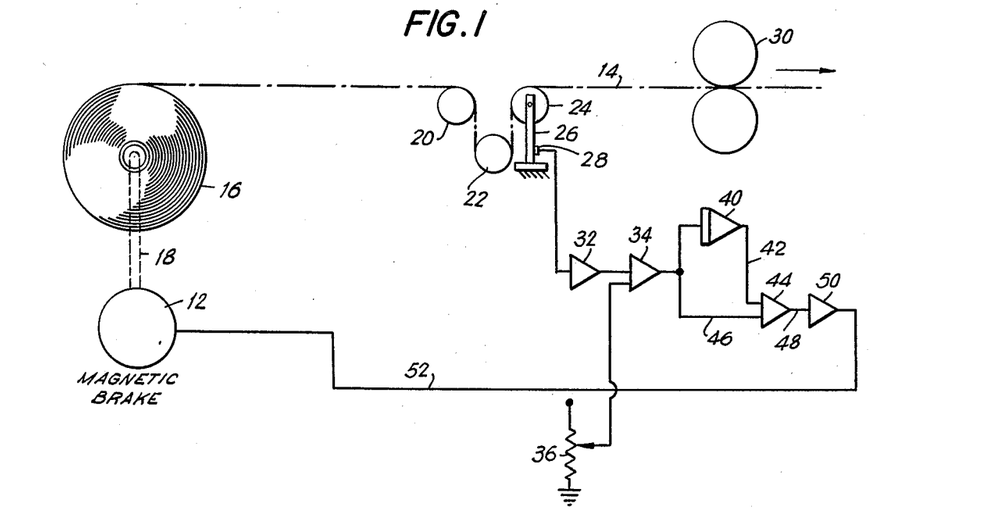
FIG. 1 is a schematic diagram showing apparatus embodying features of the invention, and in which a magnetic brake is applied to a supply roll.

Referring to FIG. 1 of the drawing, an electrical brake 12, preferably a magnetic brake, holds constant tension on a web 14 being drawn from a supply roll 16, by changing the braking force applied by brake 12 to a shaft 18 carrying the supply roll. In all of the drawings, the web is indicated by a dot-dash line; the electrical connections are indicated by a solid line; and mechanical shafts are indicated by parallel dotted lines. The web 14 is guided around direction changing idlers 20, 22 and 24, with the latter carried by a fixed frame 26 on which a strain gauge 28 is mounted. This provides an electrical signal which is approximately proportional to the web tension. The web is being utilized in suitable stations, for example a first printing station indicated at 30, and it is desired that the web tension be maintained constant despite variables such as change in the diameter of roll 16 as it expires.

The signal from strain gauge 28 is amplified at 32 and supplied to an operational or summing amplifier 34, here used as a substraction or differential amplifier for comparison with a reference signal from a potentiometer 36, the voltage from which is adjusted according to the web tension desired. The output of the operational amplifier 34 is a signal which is proportional to the error in web tension. This proportional error signal is supplied to an integrator 40 the output of which is connected by line 42 to a second operational or summing amplifier 44. The proportional error signal is also supplied to the summing amplifier 44, as is indicated by line 46. The output of summing amplifier 44 at 48 may be termed a correction signal, this being the sum of the proportional error signal and its integral. The correction signal is amplified at 50, and is used by way of line 52 to vary the energization of the magnetic brake 12 in that direction which tends to reduce the error, in order to maintain a constant or uniform web tension.

It is necessary to reduce the excitation of the brake 12 as the roll 16 expires. The integrator 40 helps accomplish this, it being understood that there is a small constant error signal because the radius of the roll 16 is constantly decreasing as it unwinds. This small error signal corresponds to a negligible error in tension because the radius of the supply roll changes slowly.

Figures 6, 7, 8:
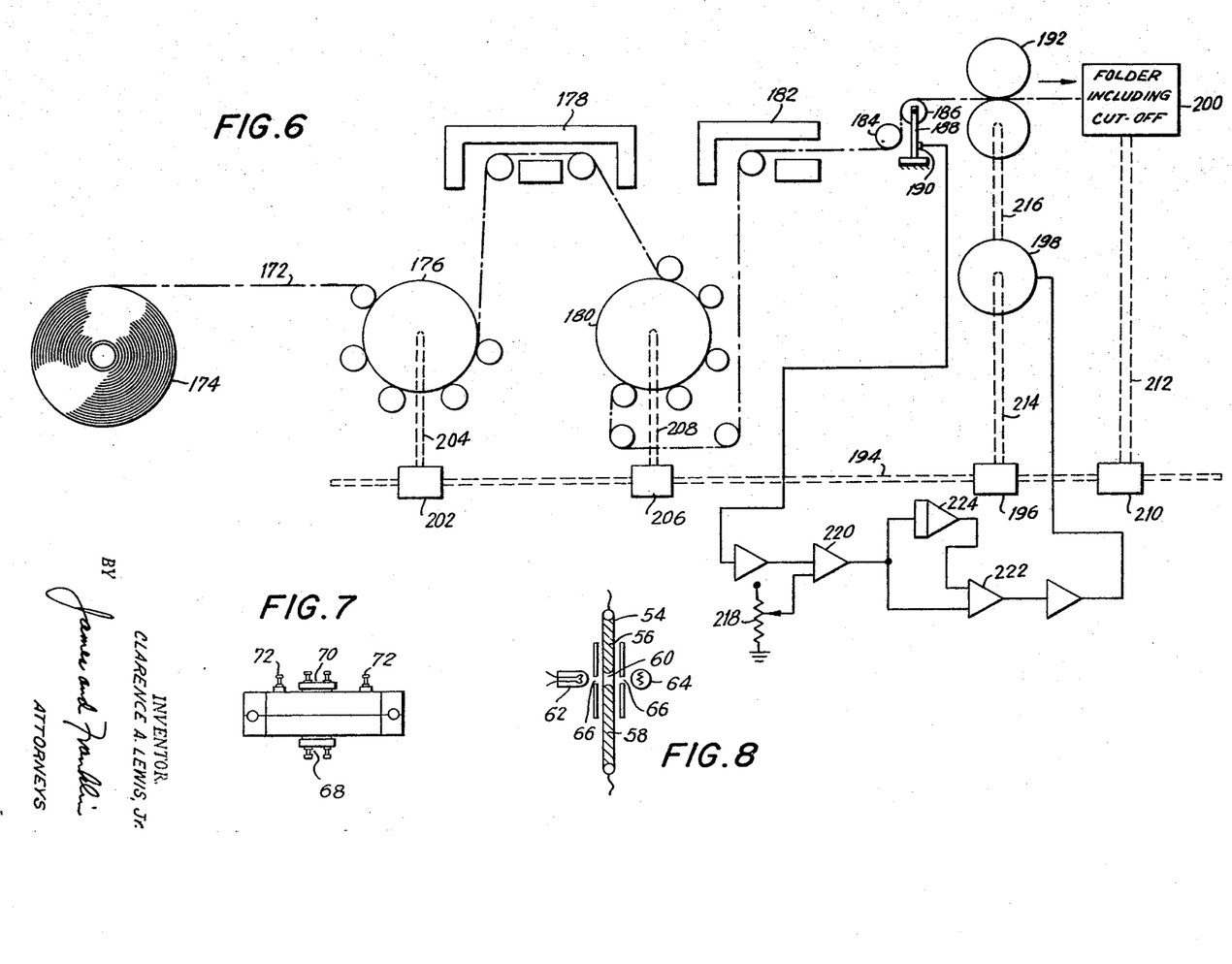
FIG. 6 shows a different multicolor printing system.
FIG. 7 illustrates a preferred form of integrator used in the present system.
FIG. 8 is explanatory of the same.

The integrator 40 is preferably a Model 251 Resistive Readout Integrator made by Curtis Instruments, Inc. of Mt. Kisco, N.Y. Referring to FIG. 8 of the drawing, this comprises a capillary tube 54 filled with two columns of mercury 56 and 58 which act as electrodes separated by a gap 60 of an aqueous electrolyte. A DC signal applied to the electrodes 56, 58 electroplates mercury across the gap, thus shifting the gap downward or upward, with a displacement which is a precise function of the current time integral. A lamp 62 illuminates a photoconductive cell 64 through gap 60, and through fixed windows 66. The electroplating action causes a build-up from one mercury electrode to the other, which shifts the transparent electrolyte window 60 relative to the fixed windows 66, and so acts as a light shutter to change the amount of light, and provides a response which is progressive and linear.

The exterior of the integrator is shown in FIG. 7, the terminals 68 being connected to the lamp 62, the terminals 70 being connected to the cell 64, and the terminals 72 being connected to the electrodes 56 and 58.

The operational or summing amplifiers each may be a microamplifier μA709 made by Fairchild Semiconductor of Mountain View, Calif. a division of Fairchild Camera and Instrument Corporation. This device is a minute integrated circuit mounted in a housing like that of a transistor, but having eight leads. It has a very high gain which however is greatly reduced by feedback to a gain of say 100. With feedback the response is made linear. It has the advantage of being relatively insensitive to supply voltage change.

The strain gauge 28 may be that made by Taylor Instrument Co. of Buffalo, N.Y. The frame motion available may be only a few thousandths of an inch, requiring a high gain amplifier, which in an ordinary system might lead to unstable control, but not in the present integrating system.

The magnetic brake 12 may be of the type sold commercially as "Magna-Brake" made by Vickers, Inc., a division of Sperry Rand Corporation located at St. Louis, Mo.

The use of a correction signal which combines both the proportional error signal and the integrated signal has a number of advantages. One is that the integrated signal is relatively large, and makes it possible to use a low gain and therefore stable system. The proportional error signal decreases with correction and so tends to offset the growth of the integrated signal, but the amount of decrease is slowed down, and this helps avoid instability. Another advantage is that the integrated signal alone is not sensitive to a sudden change, as for example, when changing from a small diameter expiring roll to a large diameter new roll by means of automatic splicing mechanism. However, the proportional error signal does respond to and does signal the sudden change. Although integration is relatively a long time function comparable with the decrease of the roll diameter, during a splice the brake excitation is changed quite rapidly due to the fact that the proportional error voltage changes rapidly, even though the integrator voltage does not.

From a control standpoint the single most important advantage of the integral channel is the fact that the error is driven to approach zero, because the integrator continues to integrate as long as an error signal is present. The advantage is in utilizing a low gain proportional loop, thereby providing a high degree of stability which cannot be achieved if only a high gain proportional loop is utilized. Another way of saying this is that the integral channel effectively looks like a very high gain proportional loop for errors which occur very gradually. Since the integrated signal alone is not sensitive to a sudden change, the proportional channel then becomes important for rapidly changing errors, and because the proportional channel is a relatively low gain channel, stability is greatly enhanced.

Another way to express the fact that the present system is relatively stable is to state that the use of these two different control loops in parallel enhances stability compared to the use of only a single control loop. Also in the particular case of control of a supply roll, there is the advantage that the integrated signal is especially well adapted to take care of a cumulative variable such as the change in diameter of the roll. Another example would be repeat length variation when working with a pre-printed web, because there again the error would be cumulative.

An integrator other than the preferred Model 251 Curtis integrator could be used. The latter will store a time integral indefinitely, for example even with the line power off, whereas in some other types of integrator the time integral is lost when the power is turned off. Also the present integrator is stable and avoids the drift which characterizes some integrators.

Figure 2:
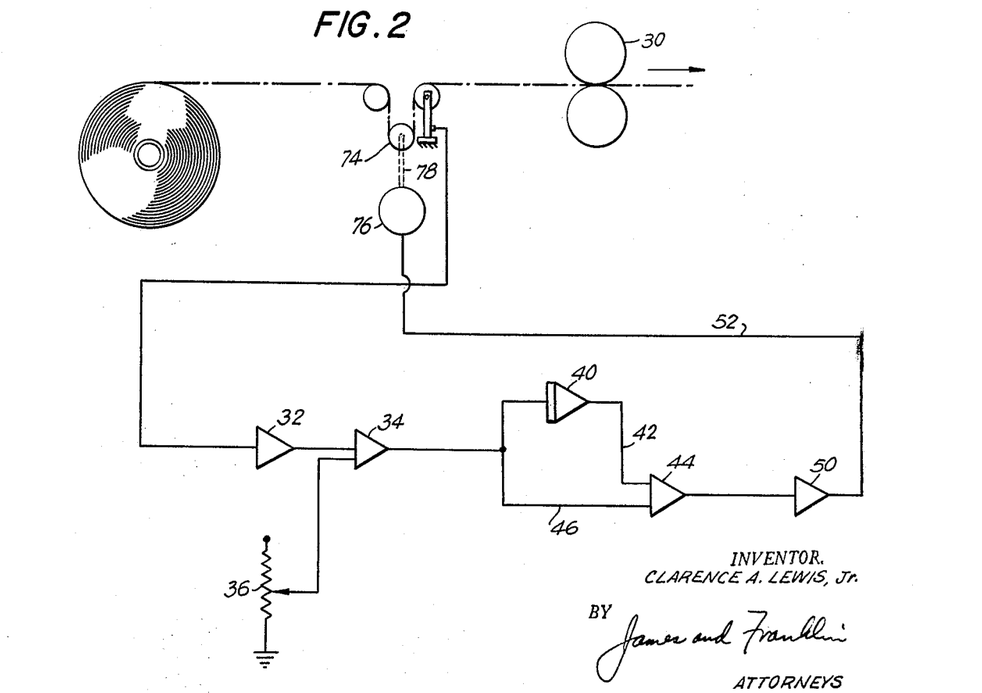
FIG. 2 is a similar view showing a system in which a magnetic brake is applied to a drag roll.

FIG. 2 shows a system very much like that shown in FIG. 1, except that the roll 74 is a drag roll instead of merely an idler roll, and the magnetic brake 76 is connected to the shaft 78 of the drag roll 74. All other parts of the system are exactly like those described in connection with FIG. 1, and require no detailed description. It should be understood that in both cases the web tension is compensated not only for the change in roll diameter, but also for other variables which affect web tension, such as a change in speed, a change in material or dimension, a change of dryer temperature when using a dryer, and other variables. The like circuitry elements are numbered the same as in FIG. 1.

Figure 3:
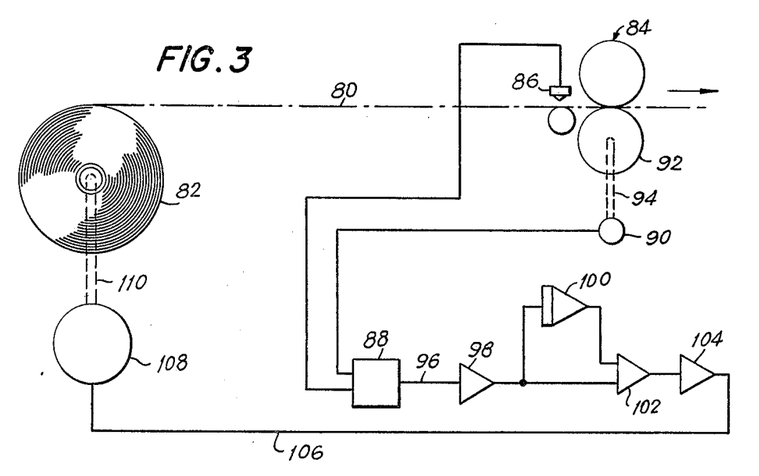
FIG. 3 shows a system like FIG. 1, but in which a pre-printed web is scanned for error detection.

FIG. 3 shows a system in which the web 80 coming from the supply roll 82 is a pre-printed web. The station 84 may be an additional printing station or it may be a cut-off station. The error to be corrected is an error in registration, and for this purpose the web 80 is scanned by means of a scanner 86 which supplies a signal or pulse to circuitry at 88. This circuitry receives a comparison signal or pulse from a so-called phase micrometer 90 which rotates with the gravure print cylinder 92, as indicated by shaft 94. The scanner 86, the phase micrometer 90, and the circuitry at 88 are all commercially available, and may, for example be the Model C372 "Registron"[1] made by the Registron Division of Bobst Champlain, Inc., located at Roseland, N.J. See also U.S. Patent 3,264,983, granted Aug. 9, 1966 to that company. It may also be a "Registron" Type C350 of that company. Briefly the scanner provides a signal corresponding to the print on the web; the phase micrometer provides a signal corresponding to the print on the cylinder, and the computer compares their timing for possible error. The output of the computer 88 on line 96 is a proportional error signal which is DC and bi-polar. It may be amplified at 98 and supplied to integrator 100, and also to operational or summing amplifier 102. The latter is also supplied with the integrated output from integrator 100, and the sum of the proportional error signal and its integral constitutes a correction signal which is amplified at 104, and then supplied by way of line 106 to a magnetic brake 108 connected to the shaft 110 of the supply roll 82. Thus the registration is maintained by varying the tension applied to and consequently the resulting stretch of the web 80. This registration may serve for an additional printing operation at station 84 (print-to-print) or a cut-off operation at station 84 (cut-to-print).

An ordinary registration system is not satisfactory with a stretchable web such as polyethylene, because the system is unstable and hunts. However, the present system which produces register by change of web tension rather than by moving a print roll back and forth, works satisfactorily and is particularly good for such materials, although not limited to such materials.

Figure 4:
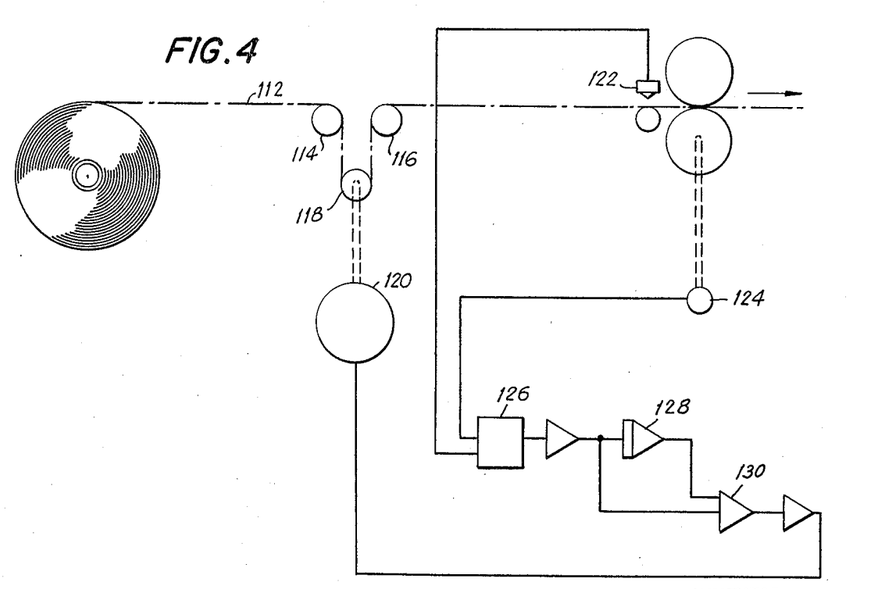
FIG. 4 is similar but with the magnetic brake applied to a drag roll instead of the supply roll.

FIG. 4 shows a system which is substantially the same as that shown in FIG. 3, except that the web 112 is looped by idlers 114 and 116 around a drag roll 118,

---

[1] See also U.S. Patent 3,264,983, granted Aug. 9, 1966.

and the magnetic brake 120 is connected to the drag roll 118 instead of to the supply roll. An error in registration is determined as before by means of a scanner 122 cooperating with a phase micrometer 124 to supply signals to a computer 126 such as the "Registron" C372. The output is a proportional error signal, and this signal, and its integral obtained in integrator 128, are summed at operational amplifier 130 to provide a correction signal which varies the energization of the magnetic brake 120.

Figure 5:
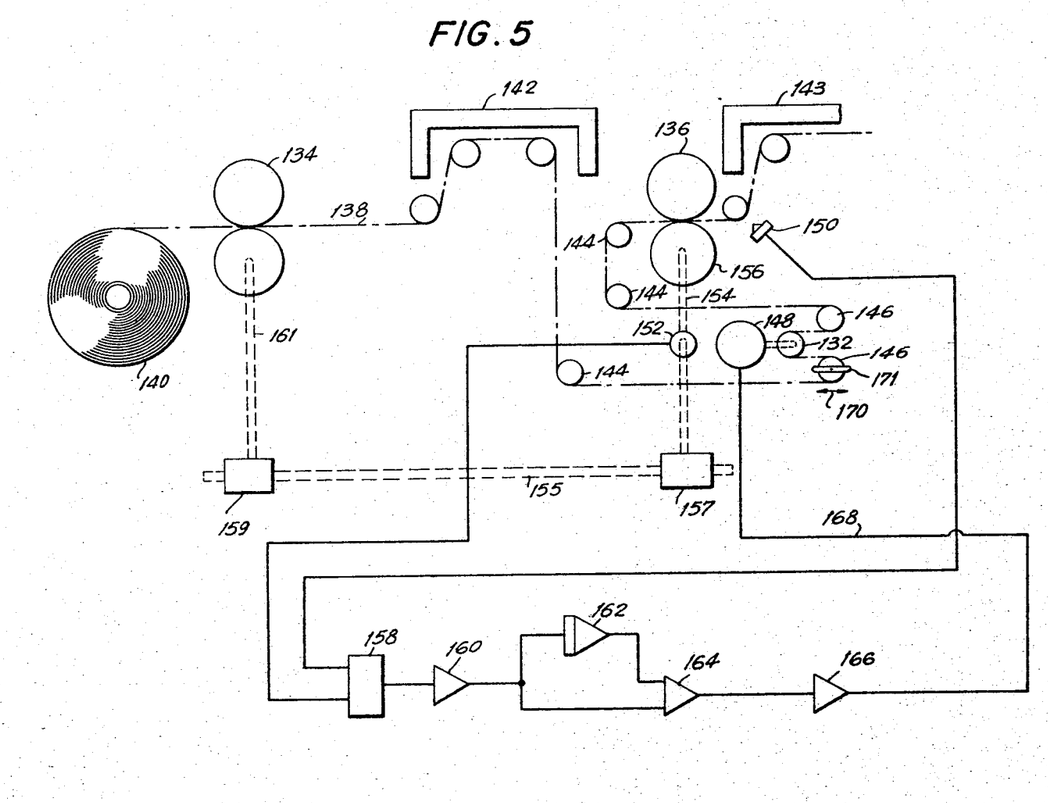
FIG. 5 shows the system applied to multicolor printing stations with registration maintained by varying the web tension between stations.

Referring now to FIG. 5, this shows a drag roll 132 in a multicolor system, for color-to-color register as between a first printing station 134 and a second printing station 136. The web 138 comes from a supply roll 140 to printing station 134, which is followed by a conventional dryer 142, and then is guided by suitable idlers such as 144 to the second printing station 136. However, before reaching station 136 it is formed into a loop by idlers 146 to wrap the web around the drag roll 132. A magnetic brake 148 is connected to the drag roll, and its energization is determined by an error signal obtained as previously described.

For this purpose there is a scanner 150, and a phase micrometer 152 connected to the shaft 154 of gravure print cylinder 156. The signals from the scanner and phase micrometer are compared in computer 158 which again may be a Registron C372, to provide a proportional error signal which may be amplified at 160. The proportional error signal is integrated at 162, and both the proportional error signal and its integral are summed in an operational amplifier 164, the output of which acts as a correction signal, which is amplified at 166 and supplied on line 168 to the magnetic brake 148.

Either of the rollers 146 may be a movable roller or compensator roller, as indicated by the arrow 170 and slot 171, to bring the web into initial color-to-color registration. The roller may be moved by screw mechanism, not shown. Here again the drag brake 132 varies the tension on the web between the two printing stations, in order to maintain register by stretching the web. As already mentioned, such a system is particularly good when the web is made of a somewhat stretchable material such as polyethylene or some of the other plastics materials.

The web leaving station 136 runs to a dryer, part of which is indicated at 143. The scanner 150 scans a mark laid down by the first printing station 134, and therefore functions as though located between the two stations although it is shown scanning at a location which follows the second station. It is important that the scanner be located as close (whether before or after) to the second printing station as possible. Ideally, the scanner should observe the web directly at the nip in order to eliminate any change of register reference due to the stretchability of the web between the printing nip and the position at which the scanner is mounted. This is important when printing on polyethylene. It will be understood that as usual both printing stations are driven by a common main drive shaft 155, geared at 157 to shaft 154, and at 159 to shaft 161.

In FIG. 6 the present improvement is shown applied to a multicolor letter press which prints on both sides of a web. The web 172 comes from a supply roll 174 to a five-color letter press 176, and then goes through a dryer 178, and then to a second five-color letter press 180 which prints on the back of the web. The web then goes to a second dryer 182, and is guided by idler 184 around a roll 186 carried on a fixed stand or frame 188 having a strain gauge 190, the output of which is a measure of the web tension. The web then goes to a pull unit 192, which is driven from a main drive shaft 194 through gearing 196 and a magnetic clutch 198. The web then runs to a folder 200 where it is both cut and folded, say into "signatures." The invention is here used to maintain constant web tension on the way into the folder 200, regardless of variables such as speed, moisture content, dryer temperature, etc. A constant tension helps secure accurate operation in the folder.

The main drive shaft 194 drives the first printer 176 through gearing 202 and shaft 204; drives the second printer 180 through gearing 206 and shaft 208; and drives the folder 200 through gearing 210 and shaft 212. The feed unit 192 is similarly driven through gearing 196 and shaft 214, but in this case the magnetic clutch 198 is interposed to vary the pull of the feed unit and therefore the tension of the web. The clutch 198 is essentially the same as the magnetic brake previously referred to, and indeed, the aforesaid Vickers unit or Magna Brake is exactly the same in either case, but when used as a brake one side is locked against rotation, whereas when used as a clutch both shafts 214 and 216 are permitted to rotate.

The electrical system shown in FIG. 6 will be recognized as being identically the same as that previously described in connection with FIGS. 1 and 2, the desired tension being adjustable by means of a potentiometer 218 corresponding to the potentiometer 36 in FIG. 1. Again the operational amplifier 220 is subtractive; the operational amplifier 222 is additive; and the Curtis integrator of FIGS. 7 and 8 is represented at 224.

It may be mentioned that in the present system some of the gear mechanisms represented at 202, 206 and 210 preferably include running registers of the differential gear type, so that registration control systems of the scanner type, with correction motors at the running registers, may be employed to maintain registration as between the front and back printing and the folding operation. Such scanner systems for registration may be of conventional character, and are omitted in FIG. 6 for simplicity.

In respect to the magnetic clutch 198, an increased signal provides increased web tension, just as was the case when dealing with the magnetic brake in FIGS. 1 or 2. This is so because the magnetic brakes were located ahead of the strain gauge, whereas in FIG. 6, the drive of the feed unit 192 follows the strain gauge.

Figure 9:
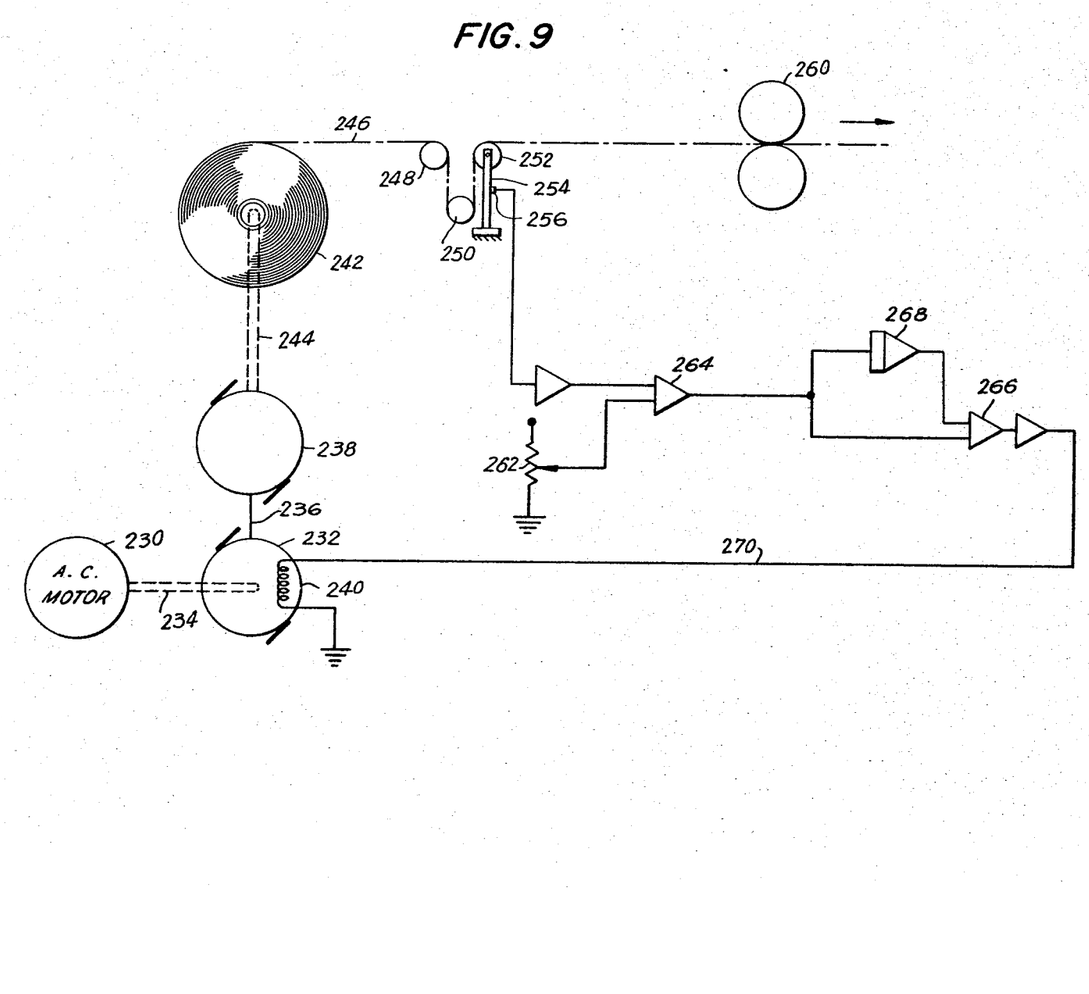
FIG. 9 shows a system in which the supply roll is assisted or braked by means of a motor to maintain uniform tension.

As so far described the systems have been applied to a magnetic brake (or clutch) to control web tension. However, the present improvement also may be applied to a motor rather than a brake, and one such system is illustrated in FIG. 9. In this case the motor control may be of a type sold commercially by Ward Leonard Electric Company of Mount Vernon, N.Y. It comprises a constant speed AC drive motor 230, which drives a DC generator 232, as indicated by shaft 234. Generator 232 supplies electrical power through line 236 to a DC motor 238. By varying the excitation of the field 240 of the generator 232, which can be done bidirectionally, both the speed and the direction of the motor 238 may be controlled. Motor 238 is connected to a supply roll 242 by means of a shaft 244, and acts as a motor to help bring the supply roll 242 up to speed when first starting up, and later may act as a brake to maintain constant tension even though there are variables including a decreasing roll diameter. The system seeks to maintain constant web tension, and motor 238 either drives or brakes the supply roll 242 for that purpose.

To measure tension the web 246 is guided by idlers 248 and 250 around a roll 252 which is carried by a fixed stand or frame 254 on which a strain gauge 256 is mounted. The web then goes to a station 260 which may be a printing unit operating on an unprinted web, or adding additional printing to a preprinted web, or it may be a cutoff station operating on a preprinted web.

The electrical system is like that previously shown in FIGS. 1, 2 and 6, the desired web tension being adjusted by potentiometer 262; the operational amplifier 264 being subtractive; the operational amplifier 266 being additive; and the Curtis integrator being represented at 268. However, the amplified correction signal on line 270 is applied to the generator field 240, rather than to a magnetic brake. The field excitation, assuming a forward drive, is increased by increased voltage for increased motor torque at shaft 244. For braking effort the polarity of the field is reversed, and again an increased excitation produces an increased braking force.

Figure 10:
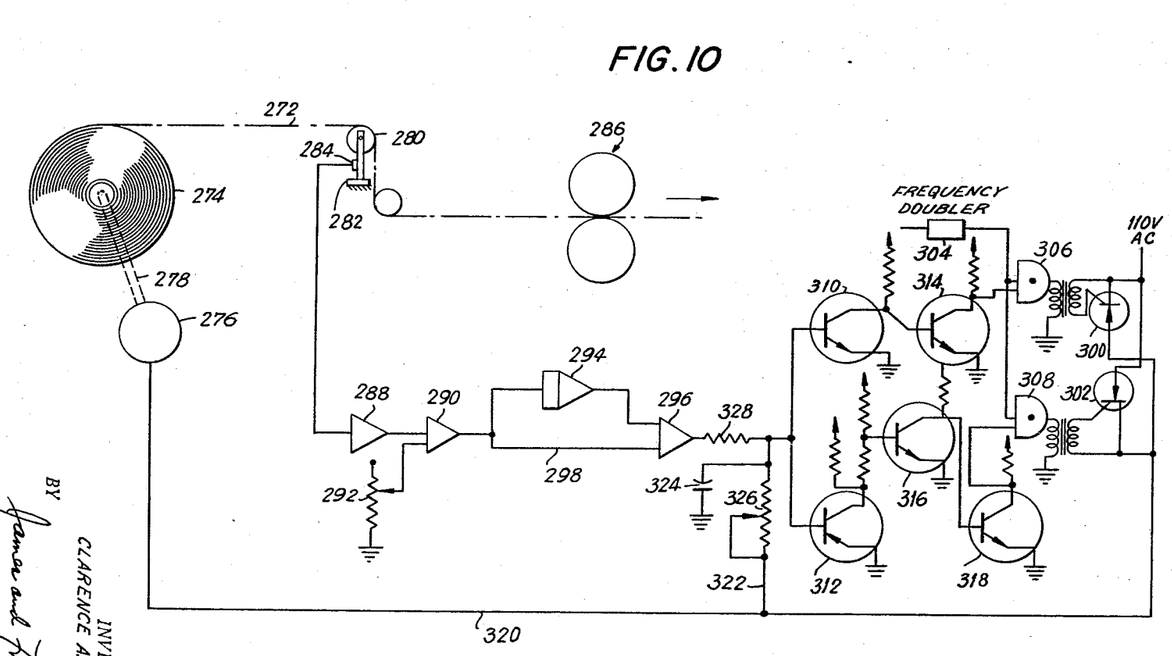
FIG. 10 shows a similar system in which the motor is controlled by silicon controlled rectifiers.

Referring now to FIG. 10, this similarly provides tension control of a web 272 drawn from a supply roll 274 which is controlled by a motor 276 connected thereto as by means of shaft 278. However, in this case the motor control is very different, it being through silicon controlled rectifiers in accordance with the disclosure in copending application Ser. No. 338,204, filed Jan. 16, 1964, and entitled "Bidirectional Electrical Servo System" since issued on Nov. 28, 1967 as Patent No. 3,355,640. The system is also described in U.S. Patent 3,264,983, issued Aug. 9, 1966, and entitled "Registration System for a Moving Web." Such a motor control is preferred by me over that shown in FIG. 9.

The web tension is measured at a roller 280 carried by a fixed stand 282 on which a strain gauge 284 is mounted. The web then is guided to a station 286 which may print an unprinted web, or add print to a preprinted web, or cut a preprinted web, etc. The signal from strain gauge 284 is amplified in amplifier 288, and compared differentially in summing amplifier 290 with a reference signal from a potentiometer 292 which, as before, serves to adjust the desired web tension. The difference or error signal is integrated at 294, and the integrated signal is combined additively in a summing amplifier 296 with the proportional error signal on line 298.

Motor 276 is a DC motor. The armature of motor 276 is energized from an ordinary AC power supply (usually 60 cycles) indicated at the upper right corner of the diagram, under control of either silicon controlled rectifier 300 or 302, to supply rectified power to the motor 276 in one polarity or the other. The motor receives only the alternate half waves, these being either the positive half waves, or the negative half waves. To accomplish this there is a frequency doubler or synchronous double frequency pulse source indicated at 304, and the 120 cycle pulse is led to AND gates 306 and 308.

The signal from the summing amplifier 296 is supplied to transistors 310 and 312, one being NPN type and the other being PNP type, so that one conducts for one polarity signal, and the other conducts for the opposite polarity signal. The output of transistor 310 goes to a transistor 314 which makes the signal digital or on-and-off in character, and the output of transistor 314 goes to the AND gate 306, and thus turns the double frequency from source 304 on or off.

If the polarity of the signal from the summing amplifier 296 is of opposite polarity or negative, it provides an output from transistor 312, which is supplied through a transistor 316, to a transistor 318 which corresponds to transistor 314 in that it converts the signal to a digital or on-and-off signal. The intermediate transistor 316 is interposed in this case in order to change from negative to positive polarity. The signal from transistor 318 is supplied to AND gate 308, in order to control the supply of the double frequency signal from source 304 to the gate of the silicon controlled rectifier 302, and so to supply power half waves of opposite polarity from the power source through line 320 to the armature of the servo motor 276.

It should be noted that there is a rate feedback loop at 322 with a by-pass or shunt capacitor 324. In effect, there is a DC feedback from motor 276 applied to the correction signal, and the effect of this may be varied by a potentiometer 326. The feedback is from the armature of servo motor 276, and helps make the control linear in character. Potentiometer 326 affects the operating speed of the servo motor in relation to the correction signal from the summing amplifier 296. A resistor 328 is shown to indicate that the signal as utilized is changed from a voltage signal to a current signal.

With this arrangement the double-frequency pulse is applied to the gate of one silicon controlled rectifier or the other (300 or 302), in order to supply a train of substantially full-width alternate and therefore unidirectional half waves, to turn the motor 276 in that direction which lessens the error. The purpose of the rate feedback loop 322 is to achieve a motor speed proportional to the magnitude of the error and regardless of the torque load.

In relation to the disclosure in FIG. 5 of the aforesaid copending application Ser. No. 338,204, the servo motor 276 here corresponds to motor 12 there; the silicon controlled rectifiers 300 and 302 here correspond to those numbered 18 and 20 there; the potentiometer 292 here corresponds to potentiometer 58 there; the strain gauge 284 here corresponds to the input 64 there. The transistors 310 and 312 here correspond to Q2 and Q4 there; transistors 314 and 318 here correspond to transistors Q3 and Q6 there; the transistor 316 here corresponds to Q5 there; the AND gate 306 here corresponds to the circuit with Q7 and Q8 there; and the AND gate 308 here corresponds to the circuit with Q9 and Q10 there.

Figure 11:
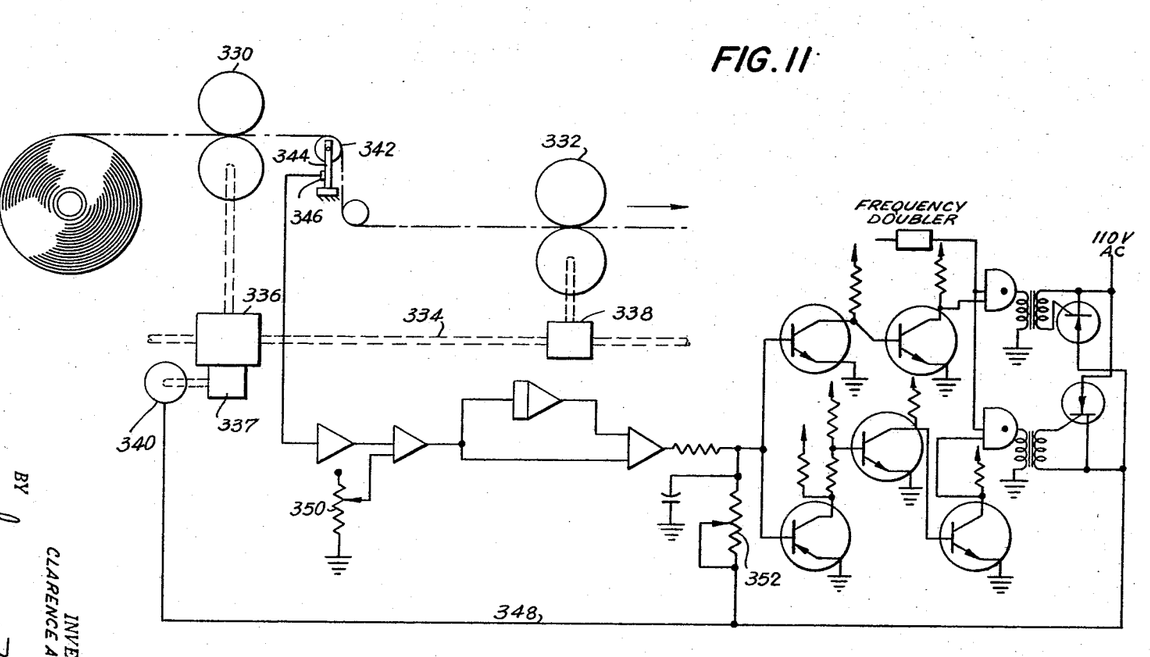
FIG. 11 shows a uniform tension system in which the correction motor is connected to a running register of the differential gear type for feeding a corrective motion to a pull station shaft.

Referring now to FIG. 11, in this case there are two stations 330 and 332 which are driven by a common drive shaft 334 through gearing indicated at 336 and 338. Station 330 may be a feed unit, and station 332 may be a printing unit for an unprinted web. The gearing at 336 includes a 360° continuous running register of the differential gear type, suggested at 337, so that corrective motion may be fed in from a servo motor 340. These continuous running registers are known, and comprise input and output shafts coupled by differential gearing, with a third shaft for another input to a ring gear carrying the spider or planet gears. Here again the object is to maintain constant tension in the web, and the tension is measured at a roll 342 carried on a fixed stand 344 on which a strain gauge 346 is mounted.

The signal from the strain gauge 346 is delivered to circuitry the same as that described in connection with FIG. 10, and the output of which on line 348 is a train of substantially full-width, alternate and therefore unidirectional half waves, to turn the DC servo motor 340 in that direction which lessens the error. The desired web tension may be adjusted by a potentiometer 350, and the effect of the rate feedback may be adjusted by potentiometer 352, as previously described.

The servo motor in FIGS. 10 and 11 (and in FIGS. 12 and 13 next described) can operate at full torque if needed, but develops only enough torque to cause a motor speed which is proportional to the magnitude of the error. The number of half-waves imposed on the armature of the motor is a function of the torque requirement. Only enough alternate half-wave pulses are delivered to the motor to maintain the speed proportional to the error while simultaneously delivering the required torque. The speed therefore decreases as the error decreases, which has the advantage that it avoids hunting.

In FIG. 10 the servo motor was connected directly to the supply roll. In FIG. 11 the feed unit is driven by the main shaft 334, and the servo motor 340 therefore works on differential gearing. It will be understood, however, that in still another arrangement, the servo motor could be applied directly to the feed unit 330 to drive the same, instead of being applied to the supply roll as shown in FIG. 10, or to differential gearing as in FIG. 11.

A system in which the motor is connected to the supply roll, instead of to a feed unit, is particularly good when dealing with a large heavy roll of a very weak web, because with the motor arrangement the roll may be brought up to speed by means of the motor, whereas a strong pull on the web would tend to tear it. Then the motor may act as a brake. A unidirectional motor could be used, with a resistor to dissipate energy as heat when used as a brake, but a reversible motor has the advantage that it operates as a regenerative brake when the roll overspeeds, and thus the motor feeds power back into the system. This eliminates the necessity of dissipating large amounts of heat, but achieves the same result at the high efficiencies characteristic of DC motors.

Figure 12:
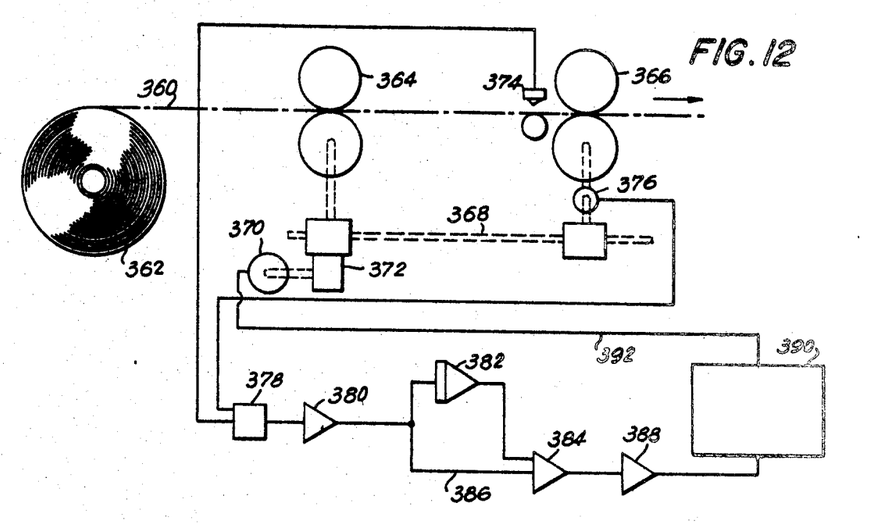
FIG. 12 shows a similar system in which the web is a pre-printed web, and in which a registration error is detected by a scanner.

Referring now to FIG. 12, the web 360 coming from supply roll 362 is a pre-printed web which passes through stations 364 and 366, both driven by a common main drive shaft 368. Station 364 may be a feed unit, and station 366 may be a printing unit or a cut-off unit. Registration is corrected by means of a servo motor 370 which feeds corrective motion into a 360° continuous running register 372 of the differential gear type, in accordance with known practice and prior description herein.

Registration error is determined by means of a scanner 374 and a phase micrometer 376, signals from which are supplied to circuitry at 378, such as the Registron C372 previously referred to, to provide a proportional error signal which may be amplified at 380. This signal is integrated at 382, and the integral is summed in summing amplifier 384 with the proportional error signal on line 386. The summed output is amplified at 388, and is used to control the operation of the servo motor 370. This is preferably done by means of silicon controlled rectifier circuitry like that shown in FIGS. 10 and 11, and here symbolized by a box 390. The output from box 390 on line 392 corresponds to line 320 in FIG. 10, and line 348 in FIG. 11. The scanner 374 (FIG. 12) may be located anywhere along the web, but preferably is located closely adjacent the printing station 366.

Figure 13:
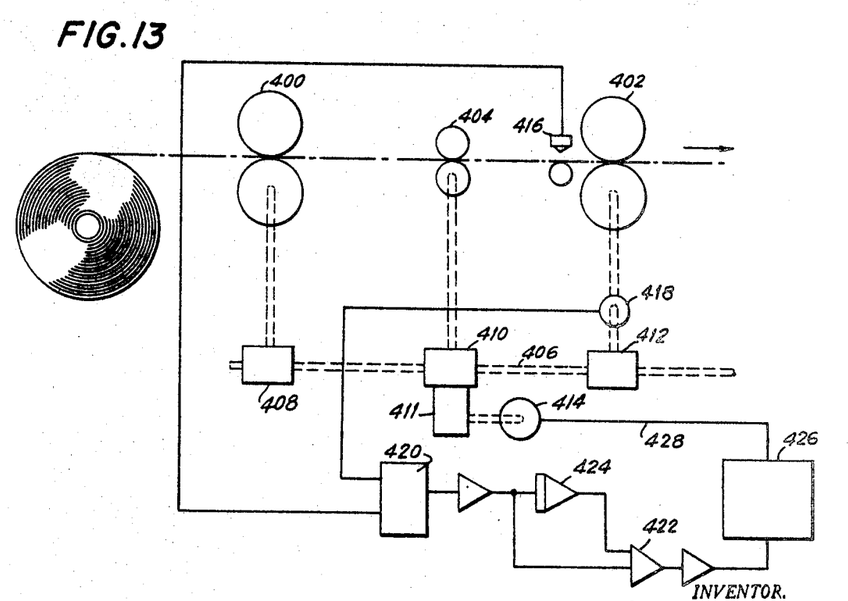
FIG. 13 shows a similar system applied to multicolor printing stations.

Still another arrangement is shown in FIG. 13. In this case the web is unprinted, and there is a first printing station 400, and a second printing or cut-off station 402, with a feed unit 404 therebetween. The stations are all driven synchronously by a main drive shaft 406 through gearing represented by boxes 408, 410 and 412. The gearing at 410 includes a 360° continuous running register of the differential gear type 411 by means of which corrective motion may be supplied from a servo motor 414.

Registration is determined by means of scanner 416 and a phase micrometer 418, signals from which are supplied to a computer 420 such as the "Registron" C372, previously referred to. This delivers a proportional error signal which is summed at 422 with its integral from integrator 424, to provide a correction signal which controls silicon controlled rectifier circuitry in box 426, the output from which is delivered on line 428 to the servo motor 414. This circuitry corresponds to that shown in FIG. 12, and the circuitry in box 426 corresponds to that shown and described in FIGS. 10 and 11. In this case the web tension is varied rather than kept constant, it being varied in proper direction to maintain registration.

It will be apparent from the foregoing description that the motor generator system of FIG. 9 may be used in FIGS. 10–13 in lieu of the rectifier controlled servo motor there shown, and conversely the rectifier controlled servo motor shown in FIGS. 10–13 may be used in FIG. 9 in lieu of the motor generator system there shown.

The phase micrometer 418 (FIG. 13) could be mounted on the shaft of the first station, inasmuch as the two stations are geared together, but to avoid lost motion in the gearing, it is preferred to locate it on the shaft of the second station, and the scanner 416 preferably is located close to the second station, although it could be located at a distance.

It is belived that the construction and operation of my improved web control system with integrator, as well as the advantages thereof, will be apparent from the foregoing detailed description. It will also be apparent that while I have shown and described the invention in a number of forms, changes may be made without departing from the scope of the invention, as sought to be defined in the following claims. In the claims the broad term "web error" means either a tension error or a registration error.

I claim:
1. A registration system for a printed web, said system comprising a web scanner for scanning the printed web near a station having a shaft and operating on the printed web, a phase micrometer rotating with the shaft of the station, a computer having electronic circuitry which compares signals from the scanner and from the phase micrometer to derive a proportional error signal, means to integrate the said proportional error signal, a summing amplifier, means to supply both the proportional error signal and the integral of the proportional error signal to the summing amplifier in order to provide a registration correction signal which is their sum, and web tension varying means preceding the said station for varying the tension of that part of the web located between said tension varying means and said station, said tension varying means being responsive to the registration correction signal for changing the web tension in that direction which tends to reduce the error in registration.

2. A printed web registration system as defined in claim 1, in which the tension varying means is a brake which controls the tension of the web, and in which the correction signal varies the braking effort of the brake in that direction which tends to correct the error in registration.

3. A printed web registration system as defined in claim 2, in which the brake is a magnetic brake using a magnetic coupling without friction surfaces bearing directly on one another for braking force.

4. A printed web registration system as defined in claim 2, in which the web is a preprinted web which is being drawn from a supply roll and in which the brake is applied to a shaft which rotates with the supply roll.

5. A printed web registration system as defined in claim 2, in which the web is passed around a drag roll, and in which the brake is applied to the drag roll to act as a drag brake.

6. A printed web registration system as defined in claim 1, in which the tension varying means comprises an electric motor operatively related to a web feed roll shaft and a feed roll which feeds the web, in order either to assist or to brake the movement of the feed roll and web, and in which the registration correction signal controls the operation of the motor in that direction which tends to correct the error in registration.

7. A printed web registration system as defined in claim 6, in which the motor is a DC motor the armature of which is supplied from an AC power source connected through either of two oppositely polarized silicon controlled rectifiers, a synchronous double-frequency pulse source, the armature of the motor serving to supply a rate feedback, means to compare the correction signal with the feedback, means responsive to an excess of correction signal over the feedback to supply the double frequency pulse to the gate of one silicon controlled rectifier or the other in order to supply a train of substantially full-width alternate and therefore unidirectional half waves to turn the motor in that direction which lessens the error.

8. A printed registration system as defined in claim 6, in which the motor is a reversible DC motor supplied by the generator of a motor generator set, and in which the correction signal controls the field excitation of the generator part of the motor generator set.

9. A printed web registration system as defined in claim 6, in which there is a common main drive shaft geared to and driving the feed roll shaft and the station shaft in unison, and in which the shaft of the feed roll has a 360 degree continuous running register of the differential-gear type, and in which the electric motor is connected to the running-register to feed an extra component of motion to the feed roll shaft.

10. A printed registration control system as defined in claim 9, in which the motor is a DC motor the armature of which is supplied from an AC power source connected through either of two oppositely polarized silicon controlled rectifiers, a synchronous double-frequency pulse source, the armature of the motor serving to supply a rate feedback, means to compare the correction signal with the feedback, means responsive to an excess of correction signal over the feedback to supply the double-frequency pulse to the gate of one silicon controlled rectifier or the other in order to supply a train of substantially full-width alternate and therefore unidirectional half waves to turn the motor in that direction which lessens the error.

11. A printed web registration system as defined in claim 1, in which the integrator comprises a capillary tube with two columns of mercury which act as electrodes separated by a gap with transparent electrolyte, a lamp on one side of said tube illuminating through the gap a photoconductive cell on the other side of said tube, a fixed window between the lamp and cell, and means to apply a DC signal to the mercury electrodes, causing a build-up from one electrode to the other, thereby shifting the transparent electrolyte relative to the fixed window and so acting as a light shutter to provide a progressive or integrated response, the desired integral of the proportional error signal being obtained from the said cell.

12. A printed web registration system as defined in claim 2, in which the brake is a magnetic brake using a magnetic coupling without friction surfaces bearing directly on one another for braking force, said magnetic coupling including magnetizing coils the excitation of which may be varied minutely, whereby the braking effort of the brake is varied correspondingly minutely.

13. A web control system comprising means to detect a web error and to provide an electrical signal which is approximately proportional to the error, an integrator comprises a capillary tube with two columns of mercury which act as electrodes separated by a gap with transparent electrolyte, a lamp on one side of said tube illuminating through the gap a photoconductive cell on the other side of said tube, a fixed window between the lamp and cell, and means to apply a DC signal to the mercury electrodes, causing a build-up from one electrode to the other, thereby shifting the transparent electrolyte relative to the fixed window and so acting as a light shutter to provide a progressive or integrated response, the desired integral of the proportional error signal being obtained from the said cell, a summing amplifier, means to supply both the proportional error signal and the integral of the proportional error signal to the summing amplifier to provide a correction signal which is their sum, and an error correction means responsive to the said correction signal for correction in that direction which tends to reduce the error.

References Cited

UNITED STATES PATENTS

| | | | |
|---|---|---|---|
| 3,283,228 | 11/1966 | Asseo | 318—7 |
| 3,324,363 | 6/1967 | Hill et al. | 318—6 |
| 3,343,052 | 9/1967 | Youngstrom | 318—6 |
| 3,364,404 | 1/1968 | Carlson | 318—7 |

ORIS L. RADER, Primary Examiner

A. G. COLLINS, Assistant Examiner